May 28, 1935.  R. H. WRIGHT  2,003,027
CONTROL FOR SHEARING APPARATUS
Filed May 26, 1934
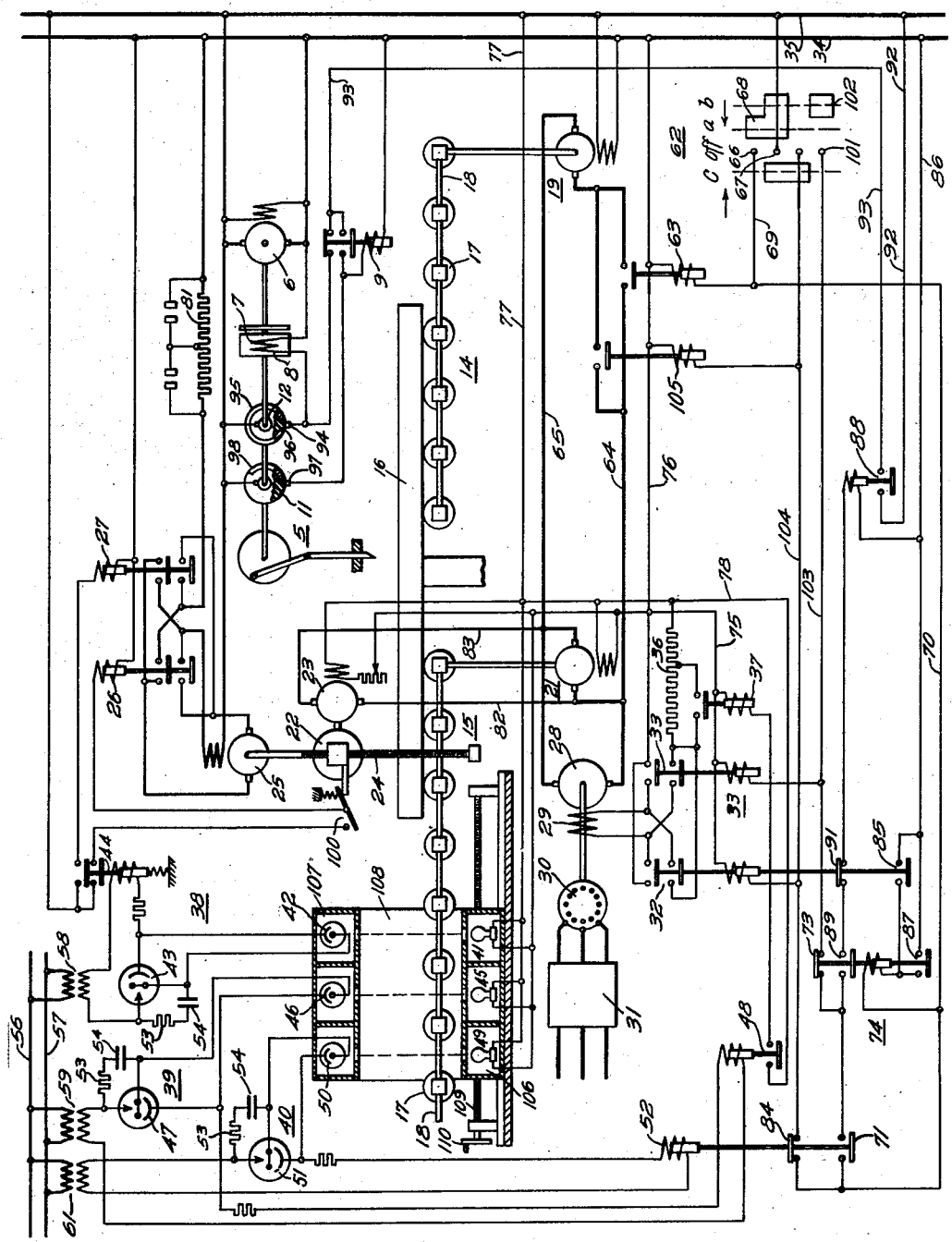
WITNESSES:
INVENTOR
Ralph H. Wright.
BY
G. M. Crawford
ATTORNEY Patented May 28, 1935

2,003,027

UNITED STATES PATENT OFFICE 2,003,027

CONTROL FOR SHEARING APPARATUS

Ralph H. Wright, Swissvale, Pa., assignor to Westinghouse Electric & Manufacturing Company, East Pittsburgh, Pa., a corporation of Pennsylvania Application May 26, 1934, Serial No. 727,766

12 Claims. (Cl. 164—48)

My invention relates, generally, to control apparatus for cutting mechanisms, and, more particularly, to a system for controlling the operation of a metal cutting shear and the material handling devices used in connection with the shear.

Heretofore, in the operation of shearing apparatus for cutting stock into predetermined lengths, it has been the usual procedure to pass the metal stock through the cutting apparatus or shear by means of roll tables, the length of the cut being determined by the position of a mechanical stop device associated with the roll table positioned on the delivery side of the shear.

In view of the fact that the metal stock is usually quite heavy, it requires that a strong and somewhat massive stop device be used in order to stop the material in the desired position when it is being carried through the shear by the roll tables.

The nature of the mechanical stop device makes it necessary to move it into and out of the path of the metal stock for each shearing operation and in addition it must also be mounted for movement along the path of the stock in order to vary the length of the cut. Such requirements demand the use of somewhat heavy and expensive actuating equipment for the mechanical stop, the operation of which consumes considerable time and involves added expense of operating the shear.

Furthermore, it has been found that the use of the mechanical stop device does not produce the best accuracy obtainable as sometimes required.

I have found that the mechanical stop may be entirely eliminated and much more satisfactory operation of the shear obtained by the use of my invention.

It is, therefore, the object of my invention, generally stated, to provide a control system for shearing and cutting apparatus which shall be simple and efficient in operation and economical to manufacture, install and operate.

A more specific object of my invention is to provide for controlling the operation of shearing or cutting apparatus in accordance with the movement of the material to be sheared through the shearing apparatus.

A further object of my invention is to provide for automatically stopping the operation of the roll tables to determine the length to be sheared in accordance with the position of the end of the stock material with respect to the cutting element of the shear.

Another object of my invention is to provide in a shearing apparatus for automatically effecting the operation of the motor for adjusting the pinch rolls, reducing the speed of movement of the material through the shear, stopping the material at the desired position and initiating the operation of the shear in a predetermined sequence in accordance with the position of the end of the material with respect to the cutting element of the shear.

A still further object of my invention is to provide for materially reducing the first cost and operating expense of shearing apparatus, for increasing the speed of shearing operations and for obtaining greater accuracy of the cut length than has been possible to obtain heretofore.

Other objects and advantages of my invention will become apparent when the following detailed description is read in connection with the drawing in which the single figure is a diagrammatic view of a shearing apparatus embodying the principal features of my invention.

In practicing my invention in its most elementary form, there is utilized a control switch such for example as a manual controller for initiating the operation of the roll tables to advance the material through the shear. The movement of the material is then controlled by light-responsive control devices which function to slow down the speed of movement of the metal on the roll tables and to finally position it in the cutting position after which the shear is automatically started to make a single cut.

Referring now to the drawing, there is illustrated a cutting device or shear 5, of well known construction, which may be driven by a motor 6 through any suitable clutch such for example as a magnetic clutch 7. Shears of this general type are usually so arranged that the actuating motor runs constantly and the shear connected thereto whenever a cut is to be made. The clutch may be either of a mechanical type or magnetic type as shown, a magnetic type clutch having a winding 8 being illustrated for the sake of simplicity.

A switch 9 and limit switches 11 and 12 are provided to control the clutch 7 in such manner that when the control switch 9 is once energized and the clutch operated, the shear 5 will make only one cutting operation and return to the starting position, as will be more fully described hereinafter.

Material handling devices in the form of roll tables 14 and 15 are provided on the entry and delivery sides of the shear, as shown, for conveying material 16 such for example, as a bloom, to and away from the shear 5. The roll tables each comprise a plurality of rollers 17 driven from common line shafts 18 by means of suitable motors. In this instance, motor 19 drives the entry roll table 14 and motor 21 the delivery roll table 15.

The shearing apparatus also includes a pinch roll 22 driven by a motor 23 and is adjustably mounted on a screw device 24 driven by an adjusting motor 25 controlled by reversing switches 26 and 27. As is well understood, the pinch roll serves to clamp and hold the material in place during the shearing operation and while a single horizontal pinch roll has been illustrated, it is to be understood that vertical pinch rolls may be used if desired in practicing my invention.

In this embodiment of my invention a variable voltage form of control has been utilized for the roll table motors 19 and 21 and the pinch roll adjusting motor 25 although it is to be understood that the fundamental principles of the invention may be utilized with other forms of control.

A variable voltage generator 28 provided with a field winding 29 and driven by a suitable motor 30 is provided for controlling the roll table motors and pinch roll adjusting motor. The motor 30 may be connected to a power source by means of any suitable controller 31.

The excitation of the generator field winding 29 may be controlled by reversing switches 32 and 33 which are operable to connect the field to a separate source of direct current power, illustrated by conductors 34 and 35, through a field resistor 36. The effectiveness of the resistor 36 may be varied by a shunting switch 37 to control the generator voltage as will be described more in detail hereinafter.

In order to provide for controlling the operations of the roll tables, the pinch roll and the shear in accordance with the movement of the material to be sheared, there is provided a plurality of light-responsive controllers 38, 39 and 40 each comprising generally a light source, a photo-cell, a grid-glow tube and control relay.

Controller 38 comprises a light source 41, a photo-cell 42, a grid glow tube 43 and a control relay 44; controller 39 comprises a light source 45, a photo-cell 46, a grid-glow tube 47 and a control relay 48 and controller 40 comprises a light source 49, a photo-cell 50, a grid-glow tube 51 and a control relay 52.

The various elements of these controllers are connected up in a well known manner through grid resistors 53 and grid condensers 54 in such manner that so long as light falls upon the photo-cells the grid-glow tubes are rendered conducting and pass sufficient current to operate their respective control relays 44, 48 and 52. A discontinuance of the light such as would occur when the beam is intercepted by an object causes the photo-cells to discontinue the passage of current and the grid voltage of the grid-glow tubes changes in such manner as to stop the flow of current and the control relay is deenergized.

As illustrated, the light-sensitive controllers are of the alternating current type, energy for operating the control relays and for controlling the glow tubes being obtained from an alternating current source, represented by conductors 56 and 57, through transformers 58, 59 and 61.

In order that a more comprehensive understanding of my invention may be obtained, a detailed description of its operation will now be set forth.

Assuming that the alternating current source represented by conductors 56 and 57 is energized and that the direct current source 34 and 35 is also energized, the light-responsive control devices 38, 39 and 40 will have functioned to energize their respective control relays 44, 48 and 52 for the reason that the light sources 41, 45 and 49 are functioning to cause the photo-cells 42, 46 and 50 to render their associated grid-glow tubes conducting.

In order to initiate the operation of the roll tables 14 and 15 to move the material to be sheared through the shear 5, a master controller shown generally at 62 may be operated to its first forward position "a", which causes the roll table motor 19 to be connected to the generator 28 and effects the operation of the generator field switch 33 to cause the generator to develop a voltage in the proper direction.

The roll table motor 19 is connected to the generator circuit through the closure of switch 63 over conductors 64 and 65.

The energizing circuit for the field switch 33 extends from conductor 35 through contact fingers 67 and 66 of the master switch bridged by the segment 68, conductors 69 and 70, lower contact members 71 of the control relay 52 which is now energized, closed contact members 73 of auxiliary relay 74, coil of switch 33 and conductors 75 and 76 to the conductor 34.

It will also be observed that since the control relay 48 is energized, an operating circuit is established for the shunting switch 37 which controls the generator field resistor 36 and this relay is closed to impress maximum voltage on the generator field 29. The circuit for operating relay 37 extends from conductor 35 through conductors 77 and 78, contact members of control relay 48, coil of relay 37 and conductors 75 and 76 to conductor 34. This causes the generator 28 to develop maximum voltage and thus operate the roll tables 14 at their highest speed in the forward direction.

When the material 16 passes through the shear and intercepts the light beam extending between the light source 41 and the photo-cell 42, the grid glow tube 43 is rendered non-conducting and control relay 44 becomes deenergized and is actuated to close its upper contact members as shown. This energizes the forward reversing switch 27 for the pinch roll adjusting motor 25 over an obvious circuit from conductors 34 and 35.

The energization of motor 25 causes the pinch roll 22 to be moved downwardly until it comes into contact with the material 16 whereupon the motor 25 is stalled through its armature resistor 81 and maintains a predetermined pressure on the material.

The pinch roll 22 is at this time being driven in accordance with the speed of movement of the material by its motor 23 which is connected to the generator terminals through conductors 82 and 83. Both the motor 23 and the delivery roll table motor 21 are in this instance permanently connected in parallel to the generator, whereas as described hereinbefore, the roll table motor 19 is not permanently connected.

The material 16 continues to advance through the shear until the second light beam extending between light source 45 and the photo-cell 46 is intercepted. This causes the glow tube 47 to become non-conducting and then control relay 48 is deenergized which, in turn, deenergizes the previously traced operating circuit for the shunting relay 37. The opening of relay 37 increases the resistance of the generator field circuit to reduce the generator voltage and consequently reduce the speed of the roll tables.

The material continues to advance toward the final stopping position until the light beam between light source 49 and the photo-cell 50 is intercepted. When this occurs, the control relay 52 becomes deenergized and closes its upper contact members 84 to establish an obvious energizing circuit through the generator field switch 32, and opens its lower contact members 71 to interrupt the energizing circuit for the generator field switch 33.

In response to the operation of the generator field switch 32, the field winding 29 is energized in the opposite direction which effect a reversal of the generator voltage to reverse the operation of the roll tables 14 and 15. The roll tables move the material in a reverse direction at low speed until a position is reached where the light beam extending between light source 49 and photo-cell 50 is uncovered.

When the light beam is again established, the control relay 52 becomes energized. However, it is ineffective to again operate the generator field switch 33 since the energizing circuit therefor has been opened by the contacts 73 of the auxiliary relay 74. The auxiliary relay 74 was energized over the lower contact members 85 of the generator field switch 32. This circuit extends from conductor 34 through conductor 86, contact members 85, coil relay 74, conductors 70 and 69 and the master switch 62 to conductor 35. A holding circuit for relay 74 is established through its lower contact members 87.

The closure of control relay 52, however, deenergizes the generator field switch 32 which kills the generator voltage and stops the material 16 in the desired cutting position.

In response to the opening of the generator field switch 32 which is the last operation which occurs before the material is finally stopped in the cutting position, an operating circuit is established for an auxiliary relay 88 which, in turn, operates to initiate the operation of the shear 5.

The operating circuit for the auxiliary relay 88 extends from conductor 35 through the closed master switch 62, conductors 69 and 70, contact members 71 of the control relay 52, contact members 89 of the auxiliary relay 74, contact members 91, coil of relay 88 and conductor 86 to conductor 34.

The operation of relay 88 establishes an energizing circuit for the magnetic clutch 7 which extends from conductor 35 through conductor 92, contact members of relay 88, conductor 93, upper contact members of relay 9 the winding 8 of clutch 12 to conductor 34.

It will be apparent that before the magnetic clutch 7 could be energized to effect a shearing operation, it was first necessary to energize the generator field switch 32 which energized auxiliary relay 74 in order to prepare a circuit for operating the auxiliary relay 88 in response to the consequent opening of the generator field switch 32 as the material 16 was moved into final cutting position.

As described hereinbefore, the shear 5 is adapted to make only a single cut and return to its normal position as shown. This operation may be accomplished in a number of different ways. However, in this embodiment of the invention an electrical scheme is shown for accomplishing it.

In order that the shear may make a complete revolution or cutting stroke after it has once been started, a limit switch 12 is utilized to provide a holding circuit for the clutch 7 and functions to establish this holding circuit as soon as the shear starts. As shown, the limit switch 12 comprises a brush 94 which is disposed to engage a contact segment 95 during the greater part of a complete revolution. The segment 95, however, has a dead spot 96 which determines the stopped position of the shear.

The second limit switch 11 is utilized to control the operation of relay 9 to establish circuits making it necessary to operate the master controller to the off position before another shearing operation may be effected. This switch is provided with a brush 97 and segment 98 which become engaged during the operation of the shear to establish an obvious energizing circuit for the relay 9.

When the relay 9 operates, its upper contact members open the original energizing circuit for the magnetic clutch 7 so that the shear will be stopped in its normal starting position by the limit switch 12 regardless of the position of the master switch 62. The closure of the lower contact members of relay 9 connects its coil to conductor 93 which is held energized by the auxiliary relay 88. Since the relay 88 is held energized through the auxiliary relay 74 and the master switch 62, it is apparent that the relay 9 cannot be deenergized unless the master switch 62 is operated to the off position.

After the cut has been made, the cut length may be removed from the roll table 15 by actuating the master switch 62 to its second forward position "b" to again establish an operating circuit for the generator field switch 33 which extends from conductor 35 through contact fingers 67 and 101 bridged by segments 68 and 102, conductor 103, conductors 75 and 76 the coil of switch 33, to conductor 34. In this instance, switch 63 is not operated and the roll table 14 remains stationary. The generator 28 energizes motor 21 to operate the roll table 15 in the forward direction until the cut length is run off on to another table or other device.

When the table 15 is cleared, all of the light beams are again established and the system is in condition for another operation after the master switch is moved to the "off" position.

The reestablishment of the light beam between the light source 41 and photo-cell 42 again energizes control relay 44 which closes its lower contact members to effect the operation of the reversing switch 26 associated with the pinch roll adjusting motor 25. The circuit for operating switch 26 is an obvious one extending through the limit switch 100 which became closed when the pinch roll 22 was moved downwardly in response to the interruption of the light beam from the light source 41.

The closure of switch 26 reverses the armature connections of the motor 25 and the pinch roll 22 is moved upwardly until the limit switch 100 is opened to stop the roll in the normal position as shown.

In the event that it is desirable at any time to reverse the operation of the roll tables, the master switch may be operated to position "c" which establishes an obvious energizing circuit through conductor 104 for the generator field switch 32 and also for a control switch 105 which like switch 63 functions to connect the roll table motor 19 to the generator.

It is apparent that the length of the cut may be readily varied by simply moving the light responsive controller 50 to different positions along the path of the material. In this embodiment of the invention the light responsive controllers have all been combined into a unit comprising generally a compartment 106 for the light sources and a compartment 107 for the photo-cells. Both of these compartments may be mounted on a frame work 108 which may be adjustably mounted for movement along the path of travel of the material by means of a screw 109 and handle wheel 110.

It is apparent, however, that these controllers may be mounted as separate units movable independently of one another, and also that instead of a hand wheel and screw for moving these units, there might be substituted almost any form of remote control whereby the cut length could be easily varied from some remote operating position.

In view of the foregoing, it is apparent that I have provided a control system for shearing apparatus which is far more efficient and effective in operation than the present types of equipment now in use.

It may be stated in conclusion that while the illustrated example constitutes a practical embodiment of my invention, I do not wish to limit myself strictly to the exact details herein illustrated, since modifications of the same may be made without departing from the spirit of the invention as defined in the appended claims.

I claim as my invention:

1. In combination, a cutting device, means for actuating the cutting device, means for carrying material into cutting position, means for initiating the operation of the material carrying means, adjustable control means responsive to the position of the material as it is moved into cutting position for stopping the material carrying means to position the material for a predetermined length of cut and for thereafter initiating the operation of the cutting device and means for adjusting the position of said control means to vary the cut length.

2. In combination, a cutting device, means for actuating the cutting device, means for carrying material into cutting position, means for initiating the operation of the material carrying means, and light-responsive means responsive to the movement of the material with respect to the cutting device for sequentially reducing the speed of stopping the carrying means to position the material for a cut of predetermined length.

3. In combination, a shearing device, means for actuating the shear, motor-operated roll tables positioned on both sides of the shear to convey material to and away from the shear, a generator for supplying power to the roll table motors, a manual controller for initiating and controlling the direction of operation of the roll tables, light-responsive means rendered effective by the operation of the controller for thereafter controlling the operation of the roll tables to position the material in a predetermined cutting position, means responsive to the stopping of the material in cutting position for initiating the operation of the shearing device and for rendering the manual controller ineffective until the cutting operation is completed, and means operable to adjust the position of the light-responsive means to vary the cut length.

4. In combination, a cutting device, means for actuating the cutting device, material handling devices for conveying material to be cut to and away from the cutting device, means for initiating the operation of the material handling devices, and light-responsive means operable in accordance with the position of the moving material for stopping the roll tables to position the material in cutting position and for initiating the operation of the cutting device, said light-responsive means being adjustably mounted whereby the cut lengths may be varied.

5. In combination, a cutting device, means for actuating the cutting device, material handling devices for conveying material to be cut to and away from the cutting device, means for initiating the operation of the material handling devices, light-responsive means controlled by the position of the moving material for reducing the speed of the material handling devices as the material approaches the cut position, additional light-responsive means for stopping the moving material as it passes the cut position and for reversing its movement to return it to the cut position, means responsive to the stopping of the material at the cut position for initiating the operation of the cutting device, and means operable to move the light-responsive means to different positions along the path of travel of the material to determine the length of the cut.

6. In combination, a shearing device, means for actuating the shear, means operable to connect the shear to the actuating means to effect a cutting operation, motor-operated roll tables on opposite sides of the shear for handling material, a motor-operated pinch roll device associated with one of said roll tables, motor-operated means for adjusting the position of the pinch roll device, a variable voltage generator for supplying power to the roll table motors and the pinch roll driving motor, means including forward and reverse switches for controlling the excitation of the generator, a master switch having a forward and a reverse position for controlling the forward and reverse excitation switches for the generator to control the direction of operation of the roll table motors and the pinch roll driving motor, forward and reverse switches for controlling the operation of the pinch roll adjusting motor, a plurality of light-sensitive control devices associated with the roll table on the delivery side of the shear and responsive in a predetermined sequence to the movement of material over the roll table, one of said control devices being operable to control the reversing switches of the pinch roll adjusting motor, another of said control devices being effective to reduce the generator voltage as the material nears the cut position, and the other of said devices being effective to open the generator field circuit to position the material in the cut position and to actuate the means to connect the shear to its actuating means to make a cut, said light-sensitive control devices being mounted on a support movable along the path of travel of the material, and means for adjusting said support to vary the length of cut.

7. In combination, a cutting device, material handling devices for conveying material to and away from the cutting device, means for driving said devices, a power source comprising a variable voltage generator, a control switch operable to initiate the operation of one of said material handling driving devices to convey material through the cutting device onto the opposite material handling device, light responsive means associated with the receiving material handling device for stopping the material in a predetermined cutting position and for thereafter initiating the operation of the cutting device, and means responsive to a further operation of the control switch for initiating the operation of the receiving material handling device to move the cut length of material away from the cutting device.

8. In combination, a shearing device, means for driving the shearing device, means operable to connect the shear to the driving device to make a cut, roll tables for conveying material to and away from the shear, motors for driving the roll tables, a generator for supplying power to the motors, means including a manual switch operable to a first position to connect one roll table motor to the generator and to energize the generator field in a predetermined direction to cause said roll table to convey material into cutting position and onto the opposite roll table, means responsive to the position of the forward end of the moving material for deenergizing the generator field to stop the material in cutting position and for thereafter operating the connecting means for the shear to effect a cutting operation, said manual switch being further operable to control the generator excitation to effect the operation of the other roll table only to convey the cut material away from the shear.

9. In combination, a shear, means operable to cause the shear to make a single cut, roll tables on the entry and delivery sides of the shear for conveying material to and away from the shear, motors for driving the roll tables, a variable voltage generator for supplying power to the roll table motors, the delivery side roll table being connected to the generator, reversing switches for controlling the generator excitation, switch means for connecting the entry side roll table motor to the generator, a manual switch operable to one position to effect the operation of the forward generator field switches and the connecting switch to operate both roll tables in a forward direction to convey material into cutting position, light-responsive means operable to reduce the generator voltage to slow down the roll tables as the material approaches the cutting position, additional light responsive means operable to deenergize the forward generator field reversing switches and energize the reverse generator field reversing switches to stop and position the material in cutting position, and means responsive to the stopping of the material for initiating the operation of the shear.

10. In combination, a shear, means operable to cause the shear to make a single cut, roll tables on the entry and delivery sides of the shear for conveying material to and away from the shear, motors for driving the roll tables, a variable voltage generator for supplying power to the roll table motors, the delivery side roll table being connected to the generator, reversing switches for controlling the generator excitation, switch means for connecting the entry side roll table motor to the generator, a manual switch operable to one position to effect the operation of the forward generator field switch and the connecting switch to operate both roll tables in a forward direction to convey material into cutting position, light-responsive means operable to reduce the generator voltage to slow down the roll tables as the material approaches the cutting position, additional light responsive means operable to deenergize the forward generator field reversing switches and energize the reverse generator field reversing switches to stop and position the material in cutting position, and means responsive to the stopping of the material for initiating the operation of the shear, said manual switch being operable to a second position to again close the forward generator field reversing switches and to release the connecting switch for the entry roll table motor, whereby the delivery roll table is operated to convey the cut length away from the shear.

11. In combination, a cutting device, means for actuating the cutting device, means for moving material into cutting position, means for initiating the operation of the material moving means, light-responsive means responsive to the movement of the material with respect to the cutting device for stopping the material moving means to position said material for a cut of predetermined length, and means responsive to the stopping of the material in the cutting position for initiating the operation of the cutting device.

12. In combination, a cutting device, means for actuating the cutting device, means for conveying material to be cut into cutting position, means for initiating the operation of said conveying means, light-responsive means responsive to the position of the material for reducing the speed of the conveying means as it approaches the cutting device, additional light-responsive means responsive to the position of the material for stopping the conveying means to position the material in cutting position, and means operable in response to the stopping of the material in cutting position for initiating the operation of the cutting device.

RALPH H. WRIGHT.